(12) United States Patent
Pain

(10) Patent No.: US 10,730,366 B2
(45) Date of Patent: Aug. 4, 2020

(54) FILTER TRAP FOR A MOTOR VEHICLE THERMAL DEVICE

(71) Applicant: RENAULT s.a.s., Boulogne Billancourt (FR)

(72) Inventor: Olivier Pain, Poissy (FR)

(73) Assignee: RENAULT s.a.s., Boulogne Billancourt (FR)

( * ) Notice: Subject to any disclaimer, the term of this patent is extended or adjusted under 35 U.S.C. 154(b) by 543 days.

(21) Appl. No.: 15/028,886

(22) PCT Filed: Oct. 21, 2014

(86) PCT No.: PCT/EP2014/072485
§ 371 (c)(1),
(2) Date: Apr. 12, 2016

(87) PCT Pub. No.: WO2015/059111
PCT Pub. Date: Apr. 30, 2015

(65) Prior Publication Data
US 2016/0368349 A1    Dec. 22, 2016

(30) Foreign Application Priority Data

Oct. 23, 2013 (FR) ..................... 13 60315

(51) Int. Cl.
*B60H 3/06* (2006.01)
*F02M 35/02* (2006.01)
*B60H 1/00* (2006.01)

(52) U.S. Cl.
CPC ............ *B60H 3/0616* (2013.01); *B60H 3/06* (2013.01); *F02M 35/0203* (2013.01); *F02M 35/0209* (2013.01); *B60H 2001/00621* (2013.01)

(58) Field of Classification Search
CPC .................. B60H 3/06; B60H 3/0616; B60H 2001/00621; F02M 35/0203; F02M 35/0209
(Continued)

(56) References Cited

U.S. PATENT DOCUMENTS 4,450,961 A * 5/1984 Bies ................. B25H 3/006
206/349
5,156,662 A * 10/1992 Downing ............... B01D 46/10
55/493
(Continued)

FOREIGN PATENT DOCUMENTS

DE   20 2005 011 002 U1   10/2005
EP              1306120 A1 * 5/2003 ......... B01D 46/0002
(Continued)

OTHER PUBLICATIONS

Gilles, EP 1306120 A1 English machine translation, May 2, 2003.*
(Continued)

*Primary Examiner* — Edelmira Bosques
*Assistant Examiner* — Phillip Decker
(74) *Attorney, Agent, or Firm* — Oblon, McClelland, Maier & Neustadt, L.L.P.

(57) ABSTRACT

A filter trap for a motor vehicle thermal device is made of polymer material and includes two longitudinal edges extending along a length thereof connected by two lateral edges extending along a width thereof. The trap includes a first assembly tab extending along the length thereof and fixed to one of the lateral edges. The trap also includes a snap coupling to block the trap. The snap-coupling is fixed to one of the longitudinal edges and is located in the vicinity of another of the lateral edges. The trap also includes a second assembly tab extending perpendicular to the first assembly tab. The second assembly tab is fixed to another of
(Continued)

the longitudinal edges and is located in a vicinity of another of the lateral edges. The trap has sufficient flexibility along the length thereof to permit twisting of the trap about a longitudinal torsion axis of the trap.

16 Claims, 1 Drawing Sheet

(58) Field of Classification Search
USPC .................. 454/158; 55/501, 511, DIG. 31
See application file for complete search history.

(56) References Cited

U.S. PATENT DOCUMENTS

| | | | | |
|---|---|---|---|---|
| 5,295,602 A | * | 3/1994 | Swanson | F02M 35/0203 220/326 |
| 5,620,505 A | * | 4/1997 | Koch | B01D 46/0024 210/493.3 |
| 6,598,580 B2 | * | 7/2003 | Baumann | B01D 46/0006 123/198 E |
| 7,147,685 B2 | * | 12/2006 | Lee | B01D 46/0005 55/467 |
| 7,477,528 B2 | * | 1/2009 | Kim | H05K 5/02 361/752 |
| 8,298,308 B2 | * | 10/2012 | Li | F02M 35/0203 123/198 E |
| 8,613,785 B1 | * | 12/2013 | Davis | B01D 46/4227 55/357 |
| 2017/0335806 A1 | * | 11/2017 | Kuemmerling | B01D 46/0005 |

FOREIGN PATENT DOCUMENTS

| | | | | |
|---|---|---|---|---|
| EP | 1700722 A1 | * | 9/2006 | B60H 1/00521 |
| EP | 1 745 955 A2 | | 1/2007 | |
| FR | 2741705 A1 | * | 5/1997 | B60H 1/00321 |

OTHER PUBLICATIONS

Koch, EP 1745955 A2 English machine translation, Jan. 24, 2007.*
Helsa Automotive GmbH, DE 202005011002 U1 English machine translation, Oct. 13, 2005.*
International Search Report dated Feb. 6, 2015, in PCT/EP2014/072485 Filed Oct. 21, 2014.
French Search Report dated Jun. 18, 2014, in FR 13 60315 Filed Oct. 23, 2013.

* cited by examiner

FILTER TRAP FOR A MOTOR VEHICLE THERMAL DEVICE

BACKGROUND

The invention relates to a filter trap for a motor vehicle thermal device.

In a motor vehicle, the air is able to be pumped into the inside of the passenger compartment by a thermal device which is able to heat or cool the pumped air, as required. Said thermal device is located in the passenger compartment below the dashboard, against a sheet-metal part generally called the firewall which separates the passenger compartment from the engine compartment. The thermal device is provided, in particular, with a filter which has to be accessible from the passenger compartment so as to permit the replacement thereof. To this end, the casing of the thermal device comprises a trap, the opening thereof permitting access to this filter. Current traps are inserted by one of their ends into the casing, parallel to the surface of the casing, and fixed to the casing by clipping at the other end thereof in order to permit rapid opening of the trap without the use of tools. Generally two clips are used, located opposite one another at one of the ends of the trap. These clips are designed so as to block any movement of the trap perpendicular to the surface thereof: as a result they have a large space requirement in this perpendicular direction. Now, in some cases the trap of a thermal device is arranged on the driver's side, in the vicinity of the accelerator pedal. When the space available around the pedal is not large it may prove difficult to use such clips to fix the trap, these clips more specifically risking the obstruction of the foot of the driver actuating the pedal. Moreover, the use of screws, which require less space, is not desirable as this requires the use of a tool in an environment which is particularly restricted and difficult to access. Moreover, the addition of a screw is more costly than a clip.

Thus there is a need for a filter trap for a thermal device which may be fixed in a simple and rapid manner, and which has a small space requirement.

BRIEF SUMMARY

To this end, the subject of the invention relates to a filter trap for a motor vehicle thermal device, said trap made of polymer material being of planar elongated shape, having a length L and having two longitudinal edges extending along the length thereof connected by two lateral edges extending along the width thereof, said trap comprising:
  a first assembly tab extending in the extension of the trap along the length thereof, said first assembly tab being fixed to a lateral edge,
  a snap-coupling means designed to block said trap in a direction perpendicular to the plane of the trap, said snap-coupling means being fixed to a longitudinal edge and being located in the vicinity of the lateral edge which does not bear the first assembly tab,
  a second assembly tab extending in the extension of the trap in a direction perpendicular to the first assembly tab, said second assembly tab being fixed to the longitudinal edge which does not comprise the snap-coupling means and being located in the vicinity of the lateral edge which does not bear the first assembly tab,
  said trap being designed and arranged so as to have a sufficient flexibility along the length thereof to permit the twisting of said trap about a longitudinal torsion axis of the trap, for example a central longitudinal axis.

The trap according to the invention may thus be retained by the insertion of the assembly tabs thereof into spaces having a shape which is complementary to the thermal device, ensuring the blocking of the trap along the length and width of the trap but also in a direction perpendicular to the plane thereof, the snap-coupling means ensuring that the trap is pressed against the opening of the thermal device by blocking any movement in the same perpendicular direction. Thus it is understood that the two assembly tabs have a reduced space requirement in the direction perpendicular to the plane of the trap. Moreover, the trap may be mounted and dismantled without the use of tools. In particular, for the dismantling thereof, it is sufficient to disengage the snap-coupling means and then to perform a twisting of the trap about the longitudinal torsion axis thereof which permits the second assembly tab to be disengaged, the first assembly tab being able to be disengaged easily as a result.

Advantageously and in a non-limiting manner, the trap is designed and arranged such that the deformation to which it is subjected when twisted is temporary and reversible. In other words, the trap has a sufficient resilience to return to the planar state after being twisted.

Advantageously and in a non-limiting manner, the filter trap according to the invention may be designed and arranged so as to permit an angle of torsion ($\alpha$) of 15° to 50° between the two lateral edges of the trap, preferably an angle of torsion ($\alpha$) of 20° to 45°. This may promote a temporary and reversible deformation of the trap.

Advantageously and in a non-limiting manner, the snap-coupling means and the second assembly tab may be arranged symmetrically relative to the longitudinal torsion axis of the trap. This may permit the stresses to which the fixed trap is subjected to be equalized.

In order to facilitate the twisting of the trap and, in particular, a twisting which does not cause permanent deformation of the trap, the snap-coupling means and the second assembly tab may be remote from the adjacent lateral edge by a distance D which is less than or equal to L/3, preferably less than or equal to L/4 or even L/6. The snap-coupling means and the second assembly tab may be remote from the adjacent lateral edge by the same distance (they are then symmetrical) or by a distance which is different, according to the ratios cited above.

In the present invention, a tab extends in the extension of the trap when it extends parallel to the trap but has a thickness which is equal to or less than the thickness of the trap. In other words, the faces of the tab are parallel to the faces of the trap and the thickness of the tab is not greater than the thickness of the trap.

Advantageously and in a non-limiting manner, the first and second assembly tabs may have a thickness which is less than a thickness of said trap, for example equal to a maximum of 90%, or even equal to a maximum of 70%, of the thickness of said trap. This may permit the total space requirement of the trap and the means for retaining the trap provided on the thermal device to be reduced.

Advantageously and in a non-limiting manner, the first and second assembly tabs may have a face extending in the extension of a face of the trap, for example in the extension of a face of the trap designed to be arranged opposite the opening of the thermal device. This may also permit the total space requirement of the trap and the means for fixing the trap which are present on the thermal device to be reduced.

The invention further relates to a motor vehicle thermal device comprising a casing perforated by an opening for access to a filter, said casing being provided with a filter trap according to the invention, said filter trap being shaped so as to seal said opening, said thermal device comprising, on the periphery of said opening:
- a means for engagement which is shaped so as to cooperate with the snap-coupling means of the trap in order to block the trap in a direction perpendicular to the plane thereof,
- a first retaining tab and a second retaining tab, each retaining tab defining with the casing a space having a shape which is complementary to an assembly tab, the first and second retaining tabs being positioned such that the first and second assembly tabs are respectively inserted between said retaining tabs and the casing when said trap seals the opening.

The retention of the trap may thus be obtained in a simple and inexpensive manner, all the more so since the casing of a thermal device is also generally made of polymer material.

The polymer material used for the casing of the thermal device and the trap is a polymer material generally used for these applications, for example polypropylene.

Advantageously and in a non-limiting manner, the maximum height of a retaining tab perpendicular to the surface of the casing may be less than or equal to twice the thickness of the trap, thus permitting the space requirement of the thermal device around the trap to be limited. A clearance in the order of 0.01 mm to 0.2 mm, preferably 0.05 mm to 0.15 mm, for example 0.1 mm, could be provided between the second fixing tab and the second retaining tab, perpendicular to the trap, in order to facilitate the mounting and dismantling of the trap.

The invention also relates to a motor vehicle provided with a thermal device according to the invention.

BRIEF DESCRIPTION OF THE DRAWINGS

The invention is now described with reference to the accompanying non-limiting drawings, in which.

DETAILED DESCRIPTION

Figure 1:
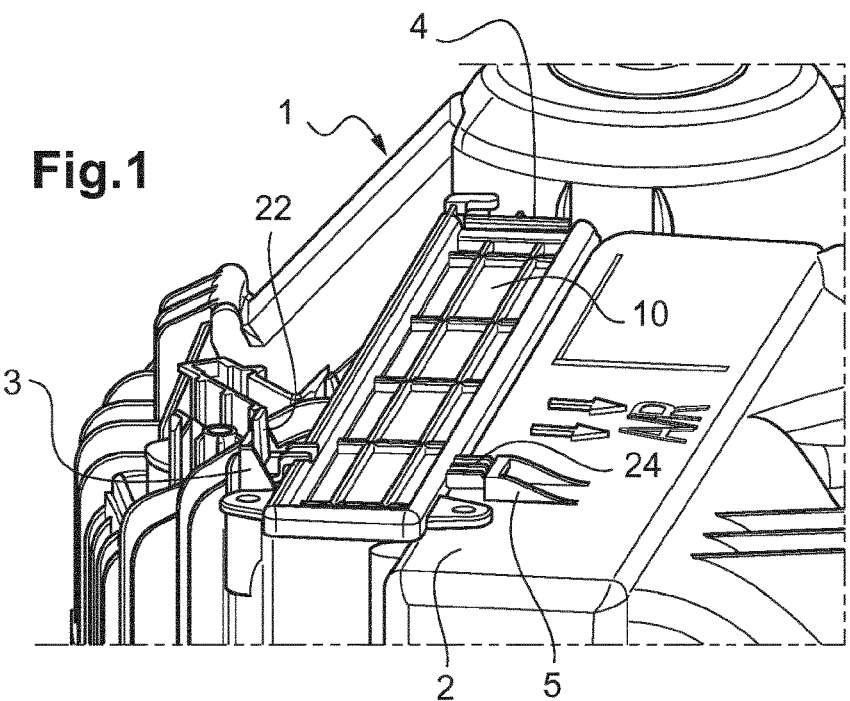
FIG. 1 shows a partial view of a thermal device provided with a filter trap according to one embodiment of the invention.

FIG. 1 partially shows a thermal device 1 comprising a casing 2 provided with a filter trap 10 according to one embodiment of the invention. This filter trap 10 seals an opening for access to a filter, this opening being concealed by the trap 10 in FIG. 1. This trap 10 is shown alone in FIGS. 2, 2a, 2b, the means for retaining the trap which are fixed to the thermal device 1 also being illustrated therein.

The trap 10 is made of polymer material, for example polypropylene. This trap 10 is of planar elongated shape and has a length L. The trap is in the form of a ribbed plate in the example. The trap 10 has two longitudinal edges 12, 14 extending along the length thereof and connected by two lateral edges 16, 18 extending along the width thereof.

The trap 10 also comprises a first assembly tab 20 extending in the extension of the trap 10 along the length thereof, this first assembly tab 20 being fixed to a lateral edge 16. In the example shown, this first assembly tab 20 has a rectangular shape and extends over a part of the width of the trap 10.

The trap 10 also comprises a snap-coupling means 22 designed to block the trap 10 in a direction N perpendicular to the plane of the trap 10. This snap-coupling means 22 is fixed to a longitudinal edge 12 and is located in the vicinity of the lateral edge 18 which does not bear the first assembly tab 20.

The trap 10 finally comprises a second assembly tab 24 extending in the extension of the trap 10 in a direction perpendicular to the first assembly tab 22. In the present example, as the trap 10 is of rectangular shape, the assembly tabs 20, 24 are thus borne by perpendicular edges. In particular, the second assembly tab 24 is fixed to the longitudinal edge 14 which does not comprise the snap-coupling means 22 and is located in the vicinity of the lateral edge 18 which does not bear the first assembly tab 20.

In order to permit the mounting and dismantling thereof, the trap 10 is designed and arranged so as to have a sufficient flexibility along the length thereof to permit twisting about a longitudinal torsion axis T, this twisting being preferably carried out manually without the use of tools, and being reversible.

This may be obtained by appropriately selecting the dimensions of the trap as a function of the material used. For example, for polypropylene, for example containing 20% talc by weight (PP-TD20), the trap may have a length of 215 mm and a width of 34 mm for an average thickness of 1.4 mm, or a width/length ratio of 0.15. These dimensions could be adapted by the person skilled in the art according to the material used.

Figure 2:
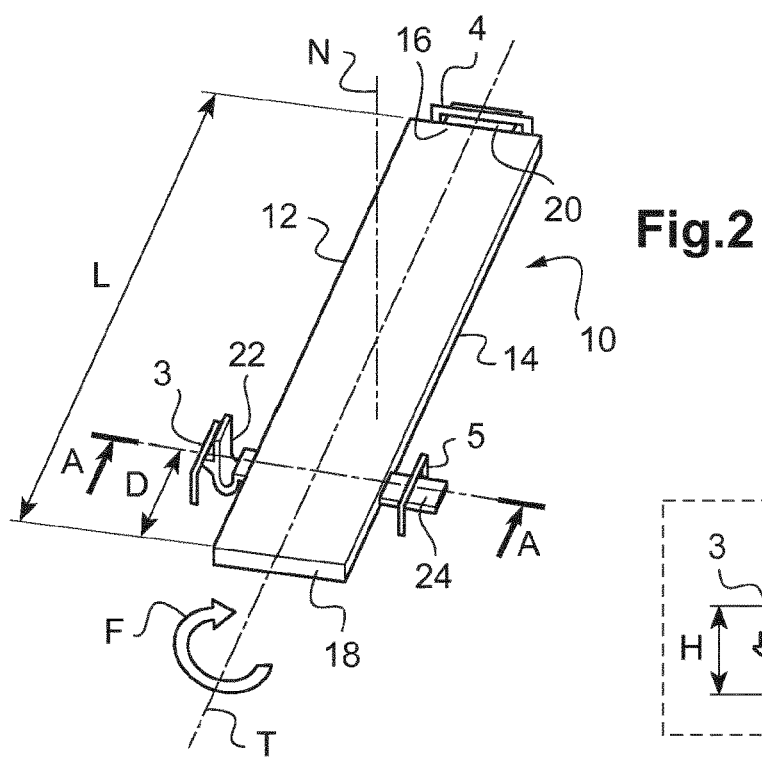
FIG. 2 shows schematically the filter trap of FIG. 1.

In the example shown, the longitudinal torsion axis T is a central longitudinal axis of the trap, as visible in FIG. 2. The trap 10 is designed and arranged, in particular, so as to permit an angle of torsion α of 15° to 50° between the two lateral edges 16, 18 of the trap, preferably an angle of torsion of 20° to 45°. This angle is shown symbolically in FIG. 2b, which schematically shows only the lateral edges 16, 18 of the trap 10, viewed along the longitudinal torsion axis T when the trap is twisted.

In this example, the second assembly tab 24 is also rectangular. Moreover, the snap-coupling means 22 and the second assembly tab 24 are arranged symmetrically relative to the longitudinal torsion axis T of the trap. In other words, the snap-coupling means 22 and the second assembly tab 24 are located at the same distance D from the adjacent lateral edge 18, this distance being less than or equal to L/3, in particular less than or equal to L/4 or even L/6. This distance D is measured from the center of the snap-coupling means 22, respectively from the center of the second assembly tab 24.

The invention is, however, not limited to this particular embodiment and the snap-coupling means 22 and the second assembly tab 24 could each be arranged at a different distance D from the adjacent lateral edge 18, this distance D preferably being less than or equal to L/3, preferably less than or equal to L/4.

Figure 2A:
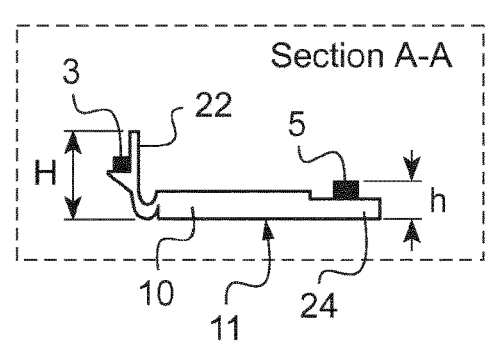
FIG. 2a shows a section of FIG. 2 along the line A-A and FIG. 2b shows schematically the trap viewed along the longitudinal torsion axis T of FIG. 2, the trap being twisted.
Figure 2B:
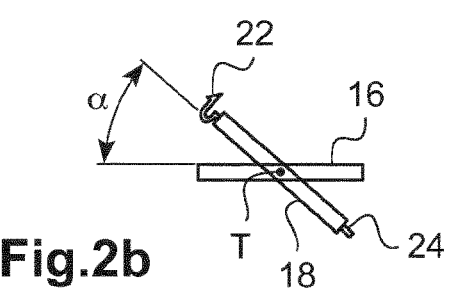

In the example shown, the first and second assembly tabs 20, 24 have a thickness which is less than a thickness of said trap, one of the faces of these assembly tabs 20, 24 extending in the extension of a face 11 of the trap, in this case the face designed to seal the opening of the thermal device 1 (FIG. 2a).

The thermal device 1 comprises, on the periphery of the opening closed by the trap 10:
- a means for engagement 3 which is shaped so as to cooperate with the snap-coupling means 20 of the trap 10 in order to block the trap in the direction N perpendicular to the plane thereof, a first retaining tab 4 and a second retaining tab 5, each retaining tab 4, 5 defining with the casing 2 a space having a shape which is complementary to an assembly tab 20, 24, the first and second retaining tabs 4, 5 being positioned such that the first and second assembly tabs 20, 24 are respectively inserted between said retaining tabs 4, 5 and the casing 2 when the trap 10 seals the opening.

In the example, the maximum height h of a retaining tab perpendicular to the surface of the casing 2 (and thus of the trap 10) is less than or equal to twice the thickness of the trap (in this same direction) and less than the height H of the snap-coupling means (see FIG. 2a). Thus it is observed that the space requirement along the perpendicular line N of the trap 10 and the retaining means 5 thereof is reduced, which may enable it to be arranged in a restricted space of the vehicle without the risk of obstructing the occupants of the vehicle.

The mounting of the trap 10 may be carried out in the following manner. The first assembly tab 20 is inserted below the retaining tab 4 of the casing 2 of the thermal device 1, then the trap 10 is twisted by an angle ($\alpha$) by the rotation of the lateral edge 18 thereof in the direction of the arrow F shown in FIG. 2, the lateral edge 16 remaining immobile. This twisting permits the insertion of the second assembly tab 24 below the corresponding retaining tab 5 of the casing 2. The release of the trap 10 permits the return thereof to the planar state and the engagement of the snap-coupling means 22 and of the means for engagement 3 of the casing (FIG. 2a). The dismantling is obtained by carrying out the above operations in reverse, namely: release of the snap-coupling means 22, twisting of the trap 10 in the same direction as during the mounting, release of the second assembly tab 24 and then release of the first assembly tab 20.

In the usual manner, whatever the arrangement and/or the positioning of the assembly tabs and the snap-coupling means, the trap 10 may also comprise a groove on the periphery of its face 11 which is in contact with the opening of the casing 2, said groove cooperating with a complementary rib of the casing 2, produced on the periphery of the opening. Said rib/groove contribute to the retention of the trap on the casing, in particular in the plane of the trap, as well as to the sealing of the trap against air in the closed position.

The invention claimed is:

1. A motor vehicle thermal device, comprising:
   a casing perforated by an opening for access to a filter, said casing being provided with a filter trap shaped so as to seal said opening, said filter trap being made of polymer material being of planar elongated shape, having a length and having two longitudinal edges extending along the length thereof connected by two lateral edges extending along a width thereof, said trap comprising:
   a first assembly tab extending in the plane of the trap along the length thereof, said first assembly tab being fixed to a first of the two lateral edges;
   a snap-coupling configured to block said trap in a direction perpendicular to the plane of the trap, said snap-coupling being fixed to a first of the two longitudinal edges and being located closer to a second of the two lateral edges than the first of the two lateral edges, the second of the two lateral edges does not bear the first assembly tab, said snap-coupling including a fixed end that is fixed to and extends from the first of the two longitudinal edges, a free end that is opposite to the fixed end, the free end extending in the direction perpendicular to the plane of the trap, and a curved portion between the free end and fixed end;
   a second assembly tab extending in the plane of the trap in a direction perpendicular to the first assembly tab, said second assembly tab being fixed to a second of the two longitudinal edges, which does not comprise the snap-coupling, and said second assembly tab being located closer to the second of the two lateral edges than the first of the two lateral edges,
   wherein said trap is configured to have a sufficient flexibility along the length thereof to permit twisting of said trap about a longitudinal torsion axis of the trap, wherein said thermal device further comprises, on a periphery of said opening:
   means for engagement which includes an opening that the snap-coupling of the trap extends through to block the trap in a direction perpendicular to the plane thereof, and
   a first retaining tab and a second retaining tab extending in the direction perpendicular to the plane of the trap, each retaining tab defining with the casing an opening having a shape which is complementary to one of the assembly tabs of the trap, the first and second assembly tabs extending through the openings defined by the first and second retaining tabs of the casing such that the first and second assembly tabs are respectively inserted between said retaining tabs and the casing when said trap seals the opening.

2. The thermal device as claimed in claim 1, wherein the trap is configured to permit an angle of torsion of 15° to 50° between the two lateral edges of the trap.

3. The thermal device in claim 2, wherein the angle of torsion is 20° to 45°.

4. The thermal device as claimed in claim 1, wherein the snap-coupling and the second assembly tab are remote from the second of the two lateral edges by a distance which is less than or equal to L/3, L being the length of the trap.

5. The thermal device as claimed in claim 1, wherein the snap-coupling and the second assembly tab are remote from the second of the two lateral edges by a distance which is less than or equal to L/4, L being the length of the trap.

6. The thermal device as claimed in claim 1, wherein the snap-coupling and the second assembly tab are remote from the second of the two lateral edges by a distance which is less than or equal to L/6, L being the length of the trap.

7. The thermal device as claimed in claim 1, wherein the first and second assembly tabs have a thickness which is less than a thickness of said trap.

8. The thermal device as claimed in claim 7, wherein the thickness of the first and second assembly tabs is equal to a maximum of 90% of the thickness of said trap.

9. The thermal device as claimed in claim 7, wherein the thickness of the first and second assembly tabs is equal to a maximum of 70% of the thickness of said trap.

10. The thermal device as claimed in claim 1, wherein the first and second assembly tabs have a face extending in an extension of a face of the trap.

11. The thermal device as claimed in claim 1, wherein a maximum height of one of the retaining tabs that is perpendicular to a surface of the casing is less than or equal to twice a thickness of the trap.

12. The thermal device as claimed in claim 1, wherein the snap-coupling and the second assembly tab are arranged symmetrically relative to the longitudinal torsion axis of the trap such that a distance measured from the second of the two lateral edges to a center of the snap-coupling is the same as a distance measured from the second of the two lateral edges to a center of the second assembly.

13. The thermal device as claimed in claim 1, wherein the means for engagement extends above a side of the free end of the snap-coupling facing away from the first of the two longitudinal edges, and the means for engagement directly contacts a tab extending upward from the free end of the snap-coupling.

14. A motor vehicle, comprising:
   a thermal device comprising a casing perforated by an opening for access to a filter, said casing being provided with a filter trap shaped so as to seal said opening, said filter trap being made of polymer material being of planar elongated shape, having a length and having two longitudinal edges extending along the length thereof connected by two lateral edges extending along a width thereof, said trap comprising:
      a first assembly tab extending in the plane of the trap along the length thereof, said first assembly tab being fixed to a first of the two lateral edges;
      a snap-coupling configured to block said trap in a direction perpendicular to the plane of the trap, said snap-coupling being fixed to a first of the two longitudinal edges and being located closer to a second of the two lateral edges than the first of the two lateral edges, the second of the two lateral edges does not bear the first assembly tab, said snap-coupling including a fixed end that is fixed to and extends from the first of the two longitudinal edges, a free end that is opposite to the fixed end, the free end extending in the direction perpendicular to the plane of the trap, and a curved portion between the free end and fixed end;
      a second assembly tab extending in the plane of the trap in a direction perpendicular to the first assembly tab, said second assembly tab being fixed to a second of the two longitudinal edges, which does not comprise the snap-coupling, and said second assembly tab being located closer to the second of the two lateral edges than the first of the two lateral edges,
      wherein said trap is configured to have a sufficient flexibility along the length thereof to permit twisting of said trap about a longitudinal torsion axis of the trap, wherein said thermal device further comprises, on a periphery of said opening:
   means for engagement which includes an opening that the snap-coupling of the trap extends through to block the trap in a direction perpendicular to the plane thereof, and
   a first retaining tab and a second retaining tab extending in the direction perpendicular to the plane of the trap, each retaining tab defining with the casing an opening having a shape which is complementary to one of the assembly tabs of the trap, the first and second assembly tabs extending through the openings defined by the first and second retaining tabs with the casing such that the first and second assembly tabs are respectively inserted between said retaining tabs and the casing when said trap seals the opening.

15. The motor vehicle as claimed in claim 14, wherein the snap-coupling and the second assembly tab are arranged symmetrically relative to the longitudinal torsion axis of the trap such that a distance measured from the second of the two lateral edges to a center of the snap-coupling is the same as a distance measured from the second of the two lateral edges to a center of the second assembly.

16. The motor vehicle as claimed in claim 14, wherein the means for engagement extends above a side of the free end of the snap-coupling facing away from the first of the two longitudinal edges, and the means for engagement directly contacts a tab extending upward from the free end of the snap-coupling.

* * * * *